United States Patent Office 3,024,276
Patented Mar. 6, 1962

3,024,276
PROCESS FOR THE PREPARATION OF AMINO-ACIDS FROM ORGANIC PEROXIDES AND NITROGEN OXIDE
Giam Paolo Chiusoli, Novara, and Francesco Minisci, Milan, Italy, assignors to Montecatini Societa Generale per l'Industria Mineraria e Chimica, Milan, Italy, a corporation of Italy
No Drawing. Filed Nov. 13, 1957, Ser. No. 696,054
Claims priority, application Italy Nov. 16, 1956
12 Claims. (Cl. 260—534)

The present invention relates to the preparation of aminoacids by means of a process in which solutions of normal or substituted oxyhydroperoxides of cycloaliphatic ketones are reacted with nitric oxide (NO), in the presence of suitable decomposition agents, such as those used in reduction-oxidation systems, particularly heavy metal salts that are capable of forming complexes with nitrogen oxide.

This reaction may be carried out in a continuous or batchwise manner, preferably in the presence of an aqueous alcohol as a solvent. The reaction takes place at atmospheric or higher pressure and at temperatures between −50° and +100° C. Among the alcohols employed are methanol, ethanol and cyclohexanol.

The aqueous alcohol solution containing one or more of the afore-mentioned metal salts in amounts lower, equal or higher than the stoichiometric amount, is saturated with NO and, at a suitable nitric oxide pressure, brought into contact with the pure peroxide or peroxide solution. The preferred solvents for the afore-mentioned solutions are methanol and higher homologues thereof, as well as cyclohexanol and others.

Subsequent hydrogenation of the resulting product leads to the formation of an amino-group.

It is, therefore, the principal object of the present invention to provide a new process for preparing aminoacids and aminoacid derivatives.

This and other objects and advantages will appear more fully from the herein-following detailed description and the appended claims.

The principle of the invention may be illustrated by the following general reaction scheme:

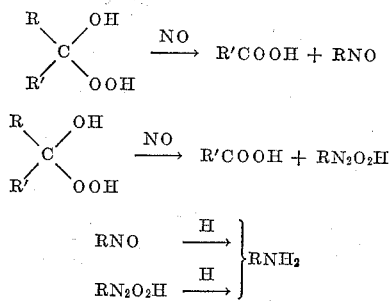

wherein R and R′ represent alkyl or aralkyl groups.

In order to obtain, for example, ε-aminocaproic acid, we start with a mixture of cyclohexanone peroxides, obtained by the action of $H_2O_2$ upon cyclohexanone or of air upon cyclohexanol. This mixture is reacted with NO, preferably at a temperature between −10° C. and +10° C. and in the presence of the afore-mentioned reducing substances.

When operating in the presence of a deficient amount of reducing metal, a mixture of acids is obtained, containing the oxime of the adipic hemi-aldehyde.

This compound, hitherto not described in the technical literature, is a white solid, M.P. 107–108° C., which crystallizes well from ethyl acetate. It is identified by means of the 2,4-dinitrophenylhydrazone, M.P. 140° C.

The reaction proceeds essentially according to the following scheme:

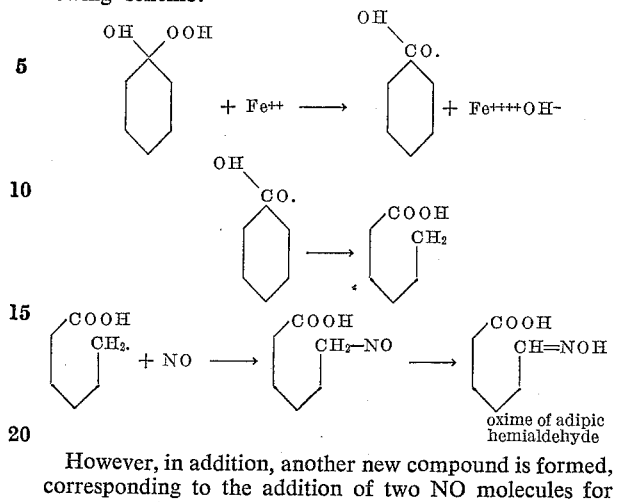

However, in addition, another new compound is formed, corresponding to the addition of two NO molecules for one molecule of cyclohexanone, i.e. the ε-isonitroamine of caproic acid:

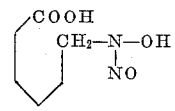

When using an excess of the reducing metal this second compound becomes the principal reaction product. It is a solid which crystallizes in form of white needles having a M.P. of 61° C. and possessing an acidimetric equivalent of 88.

For the subsequent hydrogenation step it is not necessary to separate the resulting products. It suffices to suspend Raney-nickel (or another suitable hydrogenation catalyst) in the solution of salts of the newly formed acids, preferably in the presence of ammonia and at room temperature (but in no case higher than 150° C.), while a stream of hydrogen is introduced under a normal or higher pressure.

From the solution of the ε-aminocaproic acid salt thus formed, the caprolactam can be obtained by known methods.

The following examples are presented to illustrate, but in no way to limit, the present invention.

*Example 1*

A solution of 30 g. of cyclohexanone peroxide in 250 cc. of methyl alcohol is gradually added, within one and one-half hours, to a solution containing 40 g. of $$FeSO_4 \cdot 7H_2O$$

200 cc. of methanol and 50 cc. of water saturated with nitric oxide while stirring. The reaction temperature is kept between 0° C. and 5° C. while the passage of nitrogen oxide through the solution is continued.

The solution is concentrated to a small volume and, after having been taken up again with acetone, the insoluble iron salt is removed by filtration. Acetone is distilled off, the residue is treated with sodium hydroxide and filtered. The cyclohexanone thus formed is recovered by means ether extraction. Upon acidification and further extraction with ether, 14 g. of a crude product having an acidimetric equivalent of 138 are recovered, from which, by means of crystallization from methylacetate, 6 g. of the oxime of adipic hemi-aldehyde, M.P. 107–108° C., are obtained.

Analysis: $C_6H_{11}NO_3$—
Found: 50.49% C, 7.96% H, 9.64% N
Calculated: 49.65% C, 7.59% H, 9.65% N Acidimetric equivalent 145. Calculated for the adipic hemialdehyde oxime, the acidimetric equivalent is 145.

6 g. of this oxime, neutralized with 1.2 g. of sodium hydroxide in 30 cc. of water, are hydrogenated with Raney-nickel in the presence of ammonia at 60° C., under 100 atm. hydrogen. The nickel is separated by filtration and the solution is accurately neutralized with sulfuric acid. Upon drying the solution and extracting the residue with methanol, 5 g. of ε-aminocaproic acid are obtained.

*Example 2*

A solution containing 30 g. of cyclohexanone peroxide in 250 cc. of methyl alcohol is gradually added, within one and one-half hours, at 20° C. to a solution containing 70 g. of $FeSO_4.7H_2O$, 200 cc. of methanol and 50 cc. of water, saturated with nitric oxide. The reaction heat increases the temperature gradually to 35° C.

Operating as set forth in Example 1, 20 g. of the crude product having an acidimetric equivalent of 100 are obtained which, after crystallization from benzene-petroleum ether, have a M.P. of 61° C.

Analysis: $C_6H_{12}N_2O_4$—
  Found: 40.90% C, 6.98% H, 15.28% N
  Calculated: 40.90% C, 6.87% H, 15.90% N
Acidimetric equivalent:
  Found—88.3
  Calculated—88

8 g. of this product, neutralized with bicarbonate, are hydrogenated with Raney-nickel in the presence of ammonia at 110° C. under 100 atm. hydrogen.

When operating as in the preceding example, 3 g. ε-aminocaproic acid are obtained.

*Example 3*

A solution containing 40 g. of cyclohexanone peroxide in 150 cc. of methyl alcohol is gradually added at room temperature, within a period of 4 hours, to a solution containing 120 g. of $FeSO_4.7H_2O$, 200 cc. of methanol and 100 cc. of water, saturated with nitric oxide. After the solution has been treated with alkali and filtered, alcohol and cyclohexanone are distilled off.

The remaining solution is hydrogenated with Raney-nickel in a hydrogen atmosphere at 100° C. and in the presence of ammonia. 12 g. of ε-aminocaproic acid are obtained.

*Example 4*

A solution of 20 g. of cyclohexanone peroxide in 100 cc. of alcohol and 20 cc. of water is added, within 3 hours, at room temperature to a solution, containing 23 g. of cuprous chloride and 200 cc. of 95%-ethanol saturated with NO.

Ethyl alcohol is removed, the residue is decomposed with alkali, and, by means of acidification, 10 g. of an acidic copper salt are obtained which corresponds to the formula $HOOC—(CH_2)_5.N_2O_2Cu$, is easily crystallizable from alcohol, and has a M.P. of 174° C.

Upon hydrogenation with Raney-nickel, this copper salt yields ε-aminocaproic acid.

The following examples illustrate the preparation of aminoacid derivatives by using other peroxides of cycloaliphatic ketones as starting materials.

*Example 5*

30 g. of 60%-cyclopentanone hydroperoxide (obtained from cyclopentanone and hydrogen peroxide) dissolved in 100 cc. of methanol are introduced at 0° C., within a period of 2 hours, into a solution containing an excess of ferrous sulfate dissolved in 250 cc. of methanol and 50 cc. of water, while saturating with nitric oxide.

The solvent is then removed, the residue treated with alkali and the iron hydroperoxide is filtered off. The neutral portion is separated. Then the solution is acidified and extracted with ether. Evaporation of the ether extract yields a residue consisting of 13 g. of a mixture having an acidic character, an acidimetric equivalent of 100 and a nitrogen content of 13.68%.

Upon hydrogenation of the alkaline solution of these acids in the presence of Raney-nickel and ammonia at 100° C. under 100 atm. of hydrogen, ε-amino-valerianic acid is recovered by means of the usual separation methods.

*Example 6*

20 g. of 70% methylcyclohexanone peroxide (obtained from methyl-cyclohexanone and 30% hydrogen peroxide in dioxane) dissolved in 100 cc. of methyl alcohol are added at 0° C., within a period of 2 hours, to a solution containing an excess of ferrous sulfate dissolved in 200 cc. of methanol and 50 cc. of water, while saturating with nitric oxide.

The solvent is distilled off and the residue is dissolved in acetone.

After distilling off the acetone, the iron complex is decomposed by means of an alkali, and the neutral portion is separated. Then the solution is acidified and extracted with ether. The residue remaining after evaporating the ether consists of 11.5 g. of an acidic mixture, having an acidimetric equivalent of 112 and a nitrogen content of 11.49%.

The mixture of nitrogen containing acids is neutralized with alkali and hydrogenated in the presence of Raney-nickel and ammonia at 100° C. under 100 atm. of hydrogen.

From the hydrogenated product 4-methyl-6-aminocaproic acid is recovered by means of the usual separation methods.

*Example 7*

20 g. of methylcyclohexanone peroxide are reacted as in the preceding example. The solvent is removed, the product treated with alkali and the solution is directly hydrogenated.

4-methyl-6-aminocaproic acid is thus obtained.

We claim:
1. A method of preparing an omega-amino-monocarboxylic aliphatic acid, comprising treating a peroxide of a cycloaliphatic ketone, having the linkage

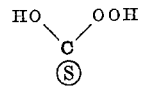

and the cycloaliphatic ring S of which is a saturated hydrocarbon ring of five to six ring carbon atoms, said ring having, as substituents, members of the group consisting of hydrogen and lower alkyl hydrocarbon radicals, with nitric oxide (NO) in aqueous alcohol in the presence of a redox promoter comprising a heavy metal divalent salt taken from the group consisting of ferrous and cuprous sulphates and chlorides, at −50° to +100° C., and hydrogenating the resulting product at a temperature between about 20° C. and 150° C. in the presence of a Raney-nickel catalyst and ammonia.

2. The process of claim 1, the alcohol being taken from the group consisting of methyl alcohol, ethyl alcohol and cyclohexanol.

3. The process of claim 1 in which the cycloaliphatic ketone is methylcyclohexanone.

4. The method of preparing ε-aminocaproic acid, which comprises preparing an aqueous methanol solution of cyclohexanone peroxide, adding slowly at room temperature a methanol solution of cuprous chloride, saturating with nitric oxide, removing alcohol by distilling, decomposing the residue by treating with an alkali, acidifying, separating the resulting acidic copper salt, and hydrogenating said copper salt in the presence of Raney nickel.

5. A method of preparing epsilon-aminocaproic acid, comprising treating cyclohexanone peroxide with nitric oxide (NO) in aqueous alcohol in the presence of a redox promoter comprising a heavy metal divalent salt taken from the group consisting of cuprous and ferrous sulphates and chlorides, at between −50° and 100° C., and hydrogenating the product at a temperature between 20° and 150° C. in the presence of a Raney-nickel hydrogenation catalyst and ammonia.

6. The process of claim 5, the alcohol being taken from the group consisting of methyl alcohol, ethyl alcohol and cyclohexanol.

7. A method of preparing epsilon-amino-valerianic acid, comprising treating cyclopentanone peroxide with nitric oxide (NO) in aqueous alcohol in the presence of a redox promoter comprising a heavy metal salt taken from the group consisting of ferrous and cuprous sulphates and chlorides, at between −50° and 100° C., and hydrogenating the product at a temperature between 20° and 150° C. in the presence of a Raney-nickel hydrogenation catalyst and ammonia.

8. The process of claim 7, the alcohol being taken from the group consisting of methyl alcohol, ethyl alcohol and cyclohexanol.

9. A process of making a compound of the group consisting of those of the following formulae:

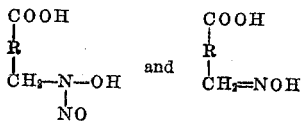

comprising treating a peroxide of a cycloaliphatic ketone, having the linkage

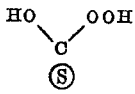

the cycloaliphatic ring S of which is a saturated hydrocarbon ring of five to six ring carbon atoms, said ring having, as substituents, members of the group consisting of hydrogen and lower alkyl hydrocarbon radicals, with nitric oxide in aqueous alcohol in the presence of a redox promoter comprising a heavy metal divalent salt taken from the group consisting of cuprous and ferrous sulphates and chlorides, said R radical being a hydrocarbon radical having from three to four carbon atoms connected to form an open chain.

10. A method of preparing a member of the group consisting of caproic acid-epsilon-isonitroamine and the oxime of adipic acid hemi-aldehyde, of the formula HOOC—(CH$_2$)$_4$—CH=NOH, comprising treating cyclohexanone peroxide with nitric oxide (NO), in an aqueous alcohol and in the presence of a redox promoter comprising a heavy metal divalent salt taken from the group consisting of ferrous and cuprous sulfates and chlorides.

11. The process of claim 10, the alcohol being taken from the group consisting of methyl alcohol, ethyl alcohol and cyclohexanol.

12. Caproic acid ε-isonitroamine, having a melting point of 61° C. and an acidimetric equivalent of 88.

References Cited in the file of this patent
UNITED STATES PATENTS
2,710,302    Hyson                 June 7, 1955

FOREIGN PATENTS
780,575    Great Britain           Aug. 7, 1957
821,400    Great Britain           Oct. 7, 1959

OTHER REFERENCES
Beilstein: Org. Chem., Band 4 (1922), p. 577.
Beilstein: Org. Chem., Band 3, Second Supplement (1943), pages 436, 437, 440.
Degering: An Outline of Organic Nitrogen Compounds, pp. 192, 193, 264 and 265 (1945).